United States Patent
Costa

(10) Patent No.: US 6,662,879 B1
(45) Date of Patent: Dec. 16, 2003

(54) SEMI-AUTOMATIC GARDEN PLANTER

(76) Inventor: John T. Costa, 2025 Hamburg Turnpike, Wayne, NJ (US) 07470

( * ) Notice: Subject to any disclaimer, the term of this patent is extended or adjusted under 35 U.S.C. 154(b) by 0 days.

(21) Appl. No.: 10/252,142

(22) Filed: Sep. 23, 2002

(51) Int. Cl.[7] .............................................. A01B 45/04
(52) U.S. Cl. .......................... 172/22; 175/20; 294/50.7; 30/316
(58) Field of Search .............................. 172/21, 22, 19, 172/20, 41, 42, 371, 374, 430, 135; 30/280, 301, 315, 316; 175/20, 135; 294/50.7

(56) References Cited

U.S. PATENT DOCUMENTS

| | | | | |
|---|---|---|---|---|
| 1,692,436 A | * | 11/1928 | Deane ........................ | 111/101 |
| 2,030,770 A | * | 2/1936 | Smith ........................ | 294/50.5 |
| 3,210,112 A | * | 10/1965 | Glynn ........................ | 294/50.7 |
| 3,273,930 A | * | 9/1966 | Gottfried .................... | 111/101 |
| 3,444,938 A | * | 5/1969 | Ballmann .................... | 111/101 |
| 4,585,072 A | * | 4/1986 | Martinez ...................... | 172/22 |
| 4,884,638 A | * | 12/1989 | Hoffman ...................... | 172/22 |
| 4,932,339 A | * | 6/1990 | List ............................ | 111/106 |
| 4,974,682 A | * | 12/1990 | Hoffman ...................... | 172/22 |
| 5,242,024 A | * | 9/1993 | Van Houten ................. | 172/19 |
| 5,338,078 A | * | 8/1994 | Basek ......................... | 294/50.5 |
| 5,469,923 A | * | 11/1995 | Visser ........................... | 172/22 |
| 5,492,181 A | * | 2/1996 | Grant ........................... | 172/22 |
| 5,662,179 A | * | 9/1997 | Falk .............................. | 175/20 |
| 6,349,776 B1 | * | 2/2002 | Hus ............................ | 172/375 |
| 6,374,758 B1 | * | 4/2002 | Mickle et al. .............. | 111/106 |
| 6,386,294 B1 | * | 5/2002 | Best .............................. | 172/22 |

* cited by examiner

*Primary Examiner*—Victor Batson
(74) *Attorney, Agent, or Firm*—Donald R. Heiner, Esq.

(57) ABSTRACT

A combined bulb and vegetable planter which is spring loaded to allow the user to readily remove a plug of soil from the ground, either for the purpose of planting vegetables and disposing of the plug of soil or planting a bulb and returning the plug of soil into the ground and over the planted bulb. In either operation, a plunger or cylinder is pressed into the soil by exerting a force on a foot rest attached to the cylinder or plunger. Extending vertically from the plunger or cylinder is a hollow tubing housing a shaft having a spring disposed about a portion thereof between a spring tension collar and an alien screw for compressing the spring when desired. A gripping handle is provided near the upper end of the vertically extending hollow tubing for the purpose of being gripped by the user of the invention. Extending above this gripping handle is a knob handle with brass plug and alien screw, and further, having a rubber compressions spacer which forms the operating mechanism for the spring.

6 Claims, 4 Drawing Sheets

SEMI-AUTOMATIC GARDEN PLANTER

BACKGROUND OF THE INVENTION

1. Field of Invention

The present invention generally involves the field of technology pertaining to a spring loaded mechanical garden tool for easily planting vegetables and bulbs into the soil. The same mechanical device may be used for either planting vegetables or as a bulb planter. Since bulbs may be planted at various depths, the device may be adjusted to the proper depth by means of depth dents on a housing or tubing as will be more fully described below.

While the structure and mechanical details are the same whether the device is being used as a bulb planter or as a vegetable planter, there is a difference in its operation. Further, only one depth dent is required when the device is being used as a vegetable planter, rather than the several dents used when the device is being used as a bulb planter.

When the device is being used as a bulb planter, a handle is pulled up vertically to a depth dent indicated on a housing or cylinder which may be of any depth, but normally, 3 inches, 4 inches, 5 inches, or 6 inches, and such movement of the handle to the appropriate depth dent simultaneously compresses a spring as will be more fully described below.

The user of this garden tool then places his or her foot on a foot rest extending horizontally across the lower end of the tubing or housing, thereby forcing a cylinder or plunger down into the ground, and a soil plug will fill the cylinder or plunger to the appropriate depth.

The device forming the subject matter of this invention is then removed from the ground, a bulb is inserted into the hole and the device is again placed over the hole, the spring is released, and the plug of soil is caused to be pushed from the cylinder or plunger and over the bulb.

When the device is to be used as a vegetable planter, a plunger plate is in its most downward position. The user of the device again places his or her foot on the foot rest, pressing the device downwardly, and the plunger or cylinder will dig into the soil.

This forces the plunger plate and shaft upwardly, vertically, into a tube until the plunger plate engages a plunger cylinder plate as will be described. The cylinder plate is the top or closed end of the cylinder or plunger.

As the plunger plate and shaft move upwardly an allen screw head will also move vertically up a grooved column formed in the tubing or housing, thereby compressing the spring. The handle is turned in the appropriate direction, and the allen screw head will engage a dent formed in the tubing or housing, thereby holding the plug of soil in the plunger or cylinder.

The device forming the subject matter of the invention is then removed from the ground, the handle is turned in the opposite direction, and the spring will move downwardly, since the allen screw will be disengaged from the dent, thereby causing the plug of soil to be discharged.

A plant can now be placed into the hole and the device is ready to be used in digging another hole. The plug of soil in the plunger or cylinder may either be discharged into the hole and over the planted vegetable or it may be discharged to another place.

2. Description of the Prior Art

A search of the prior art has uncovered the following patents: Martinez, U.S. Pat. No. 4,585,072; Price, U.S. Pat. No. 4,986,588; Deane, U.S. Pat. No. 1,692,436; Rose, U.S. Pat. No. 2,531,297; Hus, U.S. Pat. No. 6,349,776; Ballmann, U.S. Pat. No. 3,444,938; Glynn, U.S. Pat. No. 3,210,112; Ober, U.S. Pat. No. 1,783,026; List, U.S. Pat. No. 4,932,339; Hoffinan, U.S. Pat. No. 4,884,638; and Gottfried, U.S. Pat. No. 3,273,930.

No single reference cited above and found during our search discloses all of the features of applicant's invention, although some of these prior art references do disclose some, but not all, of the elements of this invention.

It is believed that the closest of these prior art references to applicant's invention is the patent to Hoffman, 4,884,638, which does disclose a threaded locking knob along a vertical slot to adjust the device to a particular depth. One of the several primary and distinctive feature of applicant's device is the employment of an alien screw head, fitting into a horizontal slot or dent formed at the upper end of the vertical slot and the further use of a plurality of slots or dents to provide varying depths when required.

The Martinez patent 4,585,072, is a device for removing weeds and planting plugs of grass, wherein a handle is operated to push a plunger through a hollow chamber to dislodge a plug of soil and any weeds carried therewith.

It is not seen that any of the above cited references either taken singularly or in combination discloses the concept of applicant's invention as will be claimed below. Further, the brass spacer may be omitted and the circular knob handle may be attached to a shaft which extends coaxially with the hollow cylinder or tubing, and inside said housing or cylinder, by means other than a brass spacer and alien screw.

SUMMARY OF INVENTION

According to the present invention, there is provided a semi-automatic garden planter which may conveniently be used both as a vegetable and bulb planter. That is, one device can perform both functions.

In general, and as will be much more fully described below in detail, the invention comprises an open ended cylinder or plunger, preferably having serrated or jagged teeth at one end, and a solid plunger or cylinder plate at its other end which forms the closed end of the cylinder or plunger. A foot rest or depression member extends horizontally across the top of and is operatively associated with the plunger or cylinder plate. Plugs of plastic or any other suitable material may be inserted into either end or both ends of the foot rest.

A length of hollow tubing extends vertically upwardly from the plunger cylinder plate through the foot rest or depression member, and at its other or distal end, extends through a handle or gripping member, which is used by the operator to hold the device during use.

As will be more fully discussed and disclosed below in association with the drawings, further operatively associated with this distal end, is a combination of a generally circular knob handle having a compression collar, brass spacer, compression rubber ring, and a plurality of allen screws, as will be more fully described below. Further, such circular knob handle may be attached to a shaft by any other convenient means thereby eliminating the need for the brass spacer, compression rubber ring, and pluraty of allen screws.

Disposed within the vertically extending hollow tubing or cylinder and extending coaxial therein is a shaft having disposed thereabout a compression spring and spring collar. One end of this shaft, distant from the handle or gripping member and circular knob handle, is attached to the plunger cylinder plate by means of a trust allen screw.

The outer tubing or cylinder has a vertically extending groove formed therein which cooperates with an allen screw which moves up and down in the groove, responsive to the compression, and extension of the spring and wherein the allen screw then engages a depth dent thereby holding the plunger at the desired depth. The spring itself is responsive to the user pulling upwardly using the knob handle. When the user lets go of the knob handle, the spring is compressed between a spring tension collar and the allen screw, as will be more fully described below.

It is therefore an object of the present invention to provide a combined bulb and vegetable planter.

It is another object of the invention to provide such a combined bulb and vegetable planter wherein bulbs may be planted at varying depths.

It is yet a further object of the invention to provide such a combined vegetable and bulb planter which is essentially operated by a spring disposed about a shaft.

It is still a further object of the invention, to provide such a combined vegetable and bulb planter wherein a shaft and spring are disposed within a vertically extending tubing or cylinder.

It is still a further object of the invention, to provide such a combined vegetable and bulb planter wherein a groove or slot is formed vertically in said tubing or cylinder and wherein an allen screw cooperates with the spring and moves vertically up and down in said vertical groove or slot responsive to the movement of a spring.

It is still a further object of the invention to provide such a combined vegetable and blub planter wherein one end of the spring carrying shaft is attached to and moves with a plunger plate inside a plunger or cylinder extending downwardly from a foot rest or depression member.

These and further objects, features and advantages of the invention shall become apparent from the following detailed description of a preferred embodiment thereof when taken in conjunction with the drawings, wherein like reference characters refer to corresponding parts in the several views.

DETAILED DESCRIPTION OF THE PREFERRED EMBODIMENT

Figures 1, 1A:
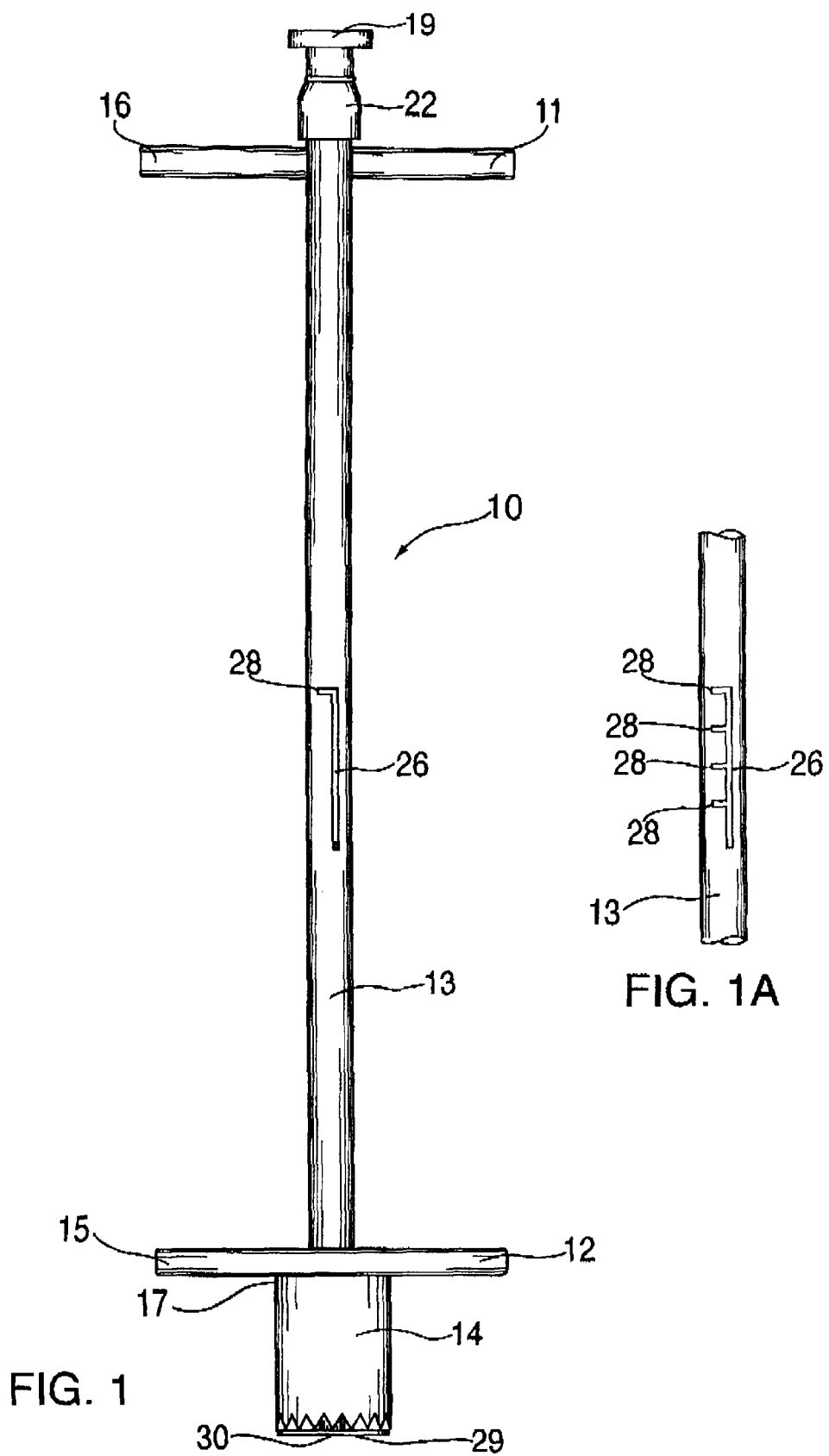
FIG. 1 is a vertical plan view of the invention in its assembled position.
Figure 2:
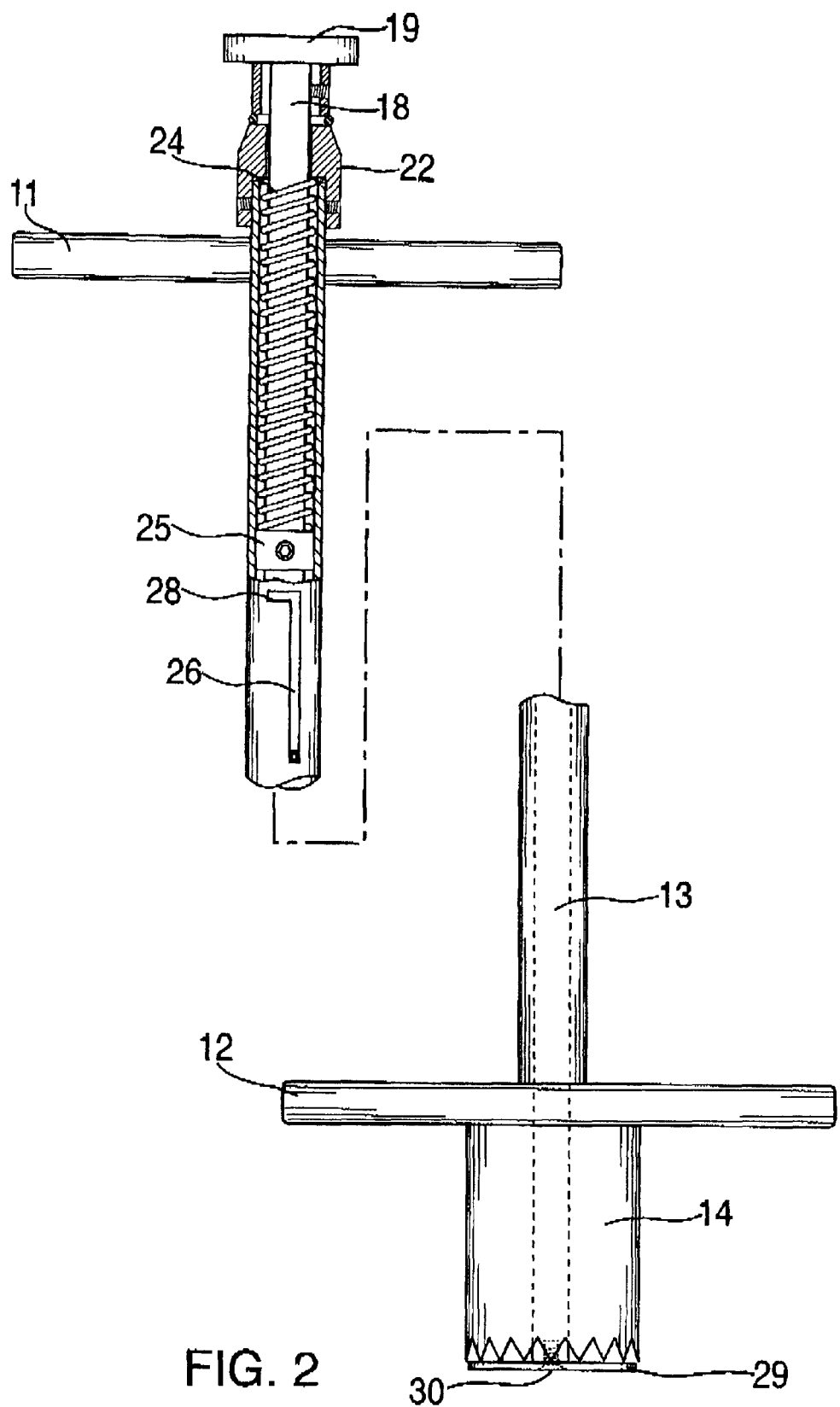
FIG. 2 is a vertical cross section of the device shown in FIG. 1.
Figure 3:
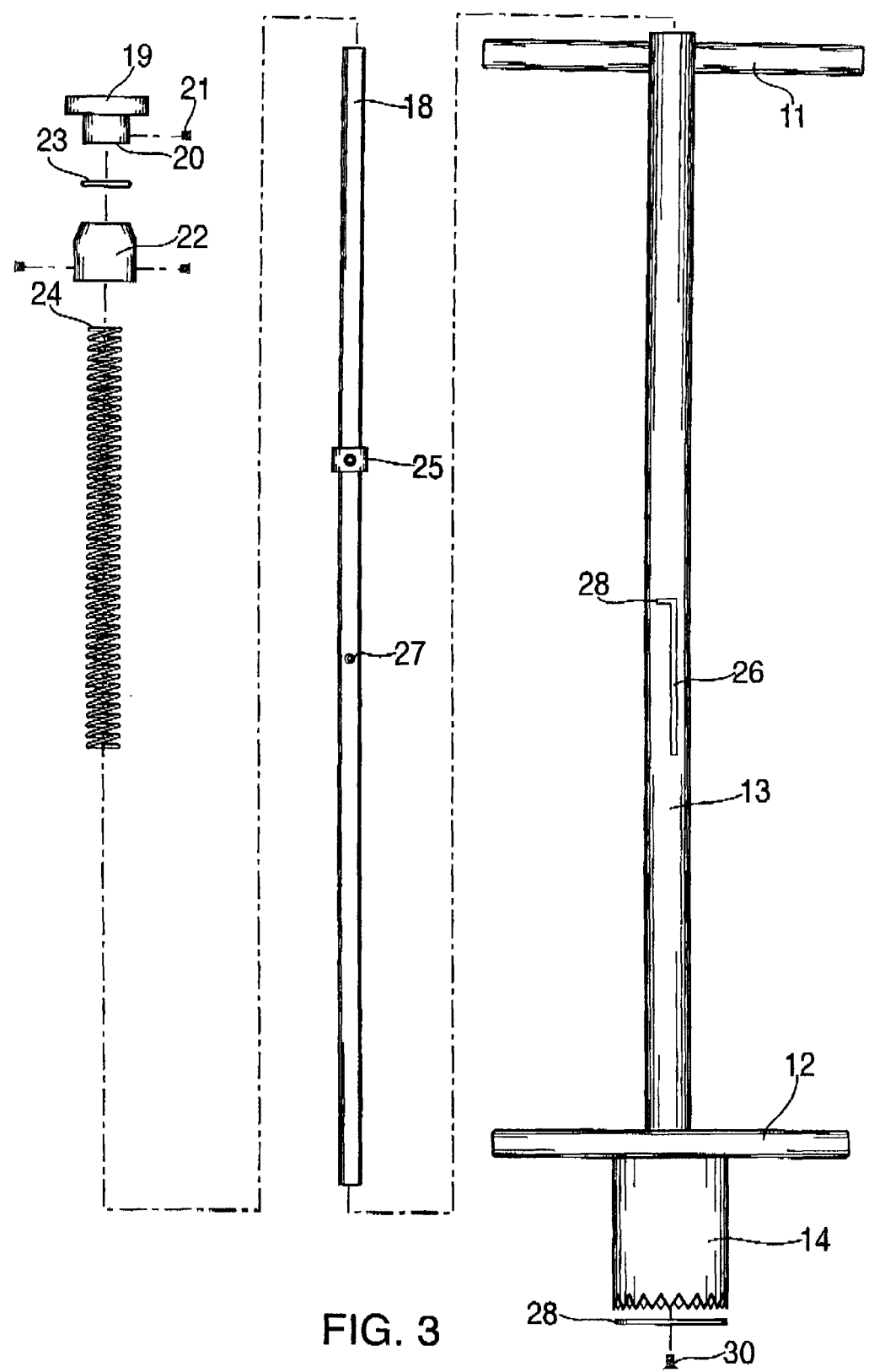
FIG. 3 is an exploded view of the device shown in FIGS. 1 and 2.
Figure 4A:
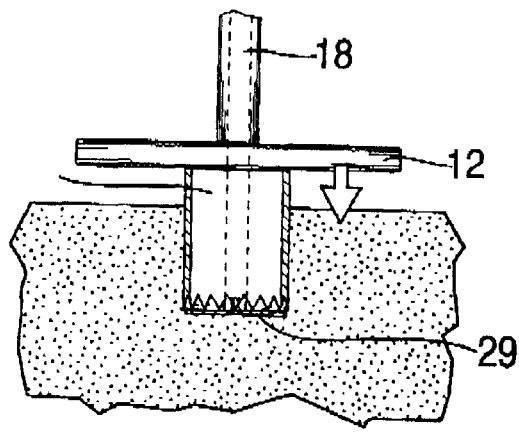
FIGS. 4A–4D are cross sectional views of the plunger, plunger plate, trust allen screw, and shaft with the plunger plate in various positions during the inventions operation.
Figure 4B:
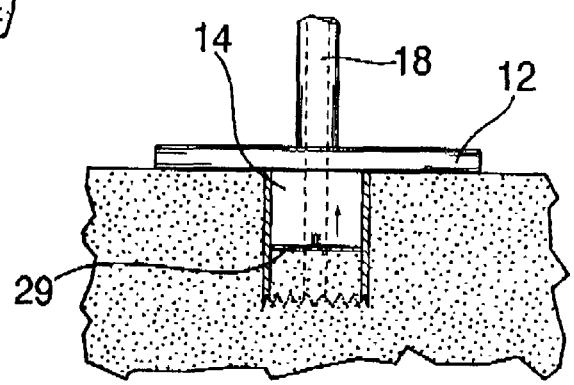
Figure 4C:
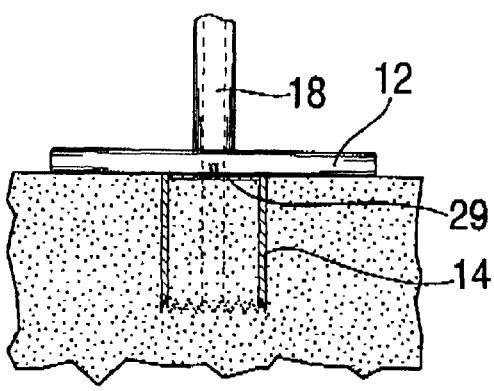
Figure 4D:
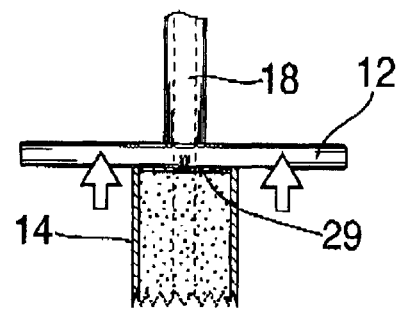
Figure 4D:
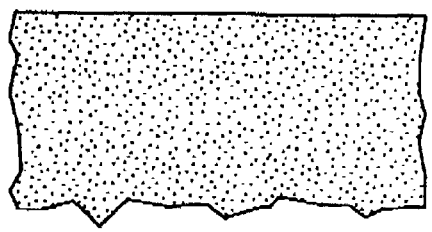

A spring actuated combined bulb and vegetable planter will now be described with reference to the drawings.

Shown at 10 is an assembled planter having an upper handle 11 and a lower foot rest or depression member 12 , both of which are attached to a vertical, hollow tubing or housing 13 by any well known means. Handle 11 and depression member 12 are disposed at opposite ends of the housing 13. A hollow cylinder or plunger 14 is attached to depression member 12 and extends vertically downwardly therefrom. Plugs 15 may be inserted into the ends of depression member 12 and may be of any suitable material such as plastic, and the upper handle 11 may have handle covers 16 of plastic or any other suitable material.

The upper end of the hollow cylinder or plunger 14 has a plunger plate 17, thereby closing this end of the plunger.

A shaft 18 extends vertically and coaxial with and is disposed in housing 13 and is spaced apart therein so that it may move vertically therein, either up or down. This shaft 18 is longer than housing 13 as will be more fully disclosed and discussed below.

Attached to and operatively associated with shaft 18 at one end near upper handle 11, is a knob handle with may be rotated clockwise or counter clockwise as required. This knob handle may be attached to the shaft 18 by any one of several well known means, such as the brass plug 20 and screw 21 shown in the drawing. It must be understood that the brass plug and screw are not necessary, and that the handle may be attached to the shaft by other means.

Depending from knob handle 19 and attached to housing 13, by means such as an alien screw is a spring tension collar 22 having disposed therein a compression ring 23 of rubber or any other suitable material. This collar 22 slidably receives one end of a spring 24 which is disposed about shaft 18 and therefore, moves with shaft 18 responsive to movement of knob handle 19. Thus, when the knob handle is pulled up the spring will move up and be compressed into spring tension collar 22. When the handle is released, as more fully described below, the spring will move downwardly or expand. This is due to the fact that the knob handle is attached to the shaft and the spring is attached to the shaft, while the housing 13 and therefore, spring tension collar 22 are stationary and affixed to each other.

A spring collar 25 is disposed about and attached to shaft 18 by any convenient means, such as, an allen screw. This collar 25 is vertically disposed below the spring tension collar 22 and below the lower end of spring 24, such that spring 24 is disposed between this collar 25 and spring tension collar 22. Thus, when the shaft moves up or down, the spring will compress or expand since one end is disposed in stationary spring tension collar 22.

A slot 26 is formed in housing 13 intermediate its two ends, and between spring collar 25 and depression member 12. An allen screw 27 or other similar pin or screw is threaded into shaft 18 such that it will move up or down in slot 26 as the shaft moves up or down in housing 13 responsive to movement of knob handle 19.

Since bulbs may be planted at varying depths, it is necessary that the spring 24 move up or down and then fixed in place while the hollow cylinder or plunger 14 is inserted into the ground to the proper depth. A plurality of depth dents 28 are formed in housing 13, along the length of slot 26, at desired distances apart from each other. These depth dents 28 cooperate with slot 26 and allen screw 27, such that when knob handle 19 is moved up or down, and therefore, spring 24 moves up or down, allen screw 27 will also move up or down. When the desired depth has been reached, knob handle 19 is rotated and with allen screw 27 aligned with the desired depth dent the screw 27 will slide into the depth dent, thereby securing the spring 24 and plunger 14 in a fixed position.

Movably attached to the lower end of shaft 18, distant from knob handle 19, is a plunger plate 29 attached by any well known means such as the trust allen screw 30 shown in the drawings. It should be obvious that when the shaft 18 is moved up or down, the plunger plate 29 will move up or down inside plunger 14. It should also be obvious that the length an d diameter of the plunger 14 may vary depending upon what is being planted, bulbs or vegetables, and at what depth.

OPERATION OF THE INVENTION

When the device is to be used as a bulb planter and realizing that bulbs may be planted at various depths, the user must first pull knob handle 19 upwardly to the desired depth dent 28 along the length of slot 26, thereby compressing the spring. The knob handle is then rotated until allen screw 27 engages the desired depth dent. The operator then steps on depression member 12 which presses the entire unit down into the soil until such time as a soil plug fills plunger 14 to the desired depth, at which time the unit is removed from the ground. The bulb is then inserted into the ground and knob handle 19 is rotated, thereby releasing the spring which causes the plunger plate 29 to move downwardly, thereby discharging the dirt over the bulb.

When the device is to be used as a vegetable planter, the plunger plate 19 is in its downward most position. The depression number is forced downwardly and the plunger 14 digs into the soil. This causes the plunger plate 29 and the shaft to move upwardly until the plunger plate nearly contacts the upper end of the hollow cylinder. This action causes the allen screw 27 to move up the slot 26, thereby compressing the spring. The knob handle 19 is then turned and the allen screw 27 will engage one of the depth dents and a soil plug will be held in the plunger 14. The unit is then removed from the ground, the knob handle is turned and the spring will therefore expand, thereby discharging the soil plug back into the ground. The plant may now be placed into the hole.

Though the invention has been described and illustrated with reference to a preferred embodiment thereof, those skilled in the art will appreciate that various changes and modifications in shape, size, composition and arrangement of parts, may be resorted to without departing from the spirit of the invention or scope of the subjoined claims.

What is claimed:

1. A gardening tool for removing soil from the ground preparatory to plainting a bulb or vegetables comprising:

(a) a vertically extending housing;

(b) a shaft extending vertically and co-axial with and disposed within said housing;

(c) a spring disposed about a portion of the length of said shaft;

(d) a slot formed vertically in said housing along a portion thereof;

(e) a horizontally extending upper handle attached to said housing near its upper end;

(f) a horizontally extending depression member attached to said housing near its lower end distant from said upper handle;

(g) a plunger attached to said depression member and extending vertically downwardly therefrom;

(h) a plunger plate disposed at the upper end of said plunger, thereby closing this end of said plunger;

(i) a second plunger plate movably attached to the lower end of said shaft for movement therewith up or down inside said plunger once the shaft moves up or down;

(j) a knob handle operatively attached to the upper end of said shaft;

(k) means disposed about said shaft and attached thereto for preventing downward movement of said spring;

(l) a spring tension collar depending from said knob handle and attached to said housing above said upper handle for receiving the upper end of said spring;

(m) a screw threaded into said shaft through said slot for slidable movement up or down therein as said shaft moves up or down responsive to movement of said knob handle; and, (n) at lease one depth dent formed in said housing and cooperating with said slot such that said screw will engage said depth dent when said knob handle is rotated when said screw is aligned with said depth dent, thereby holding said spring, said shaft, and said second plunger plate in place such that when said depression member is pushed downwardly into said soil, said plunger will fill with soil up to the position of said second plunger plate.

2. The gardening tool of claim 1, wherein a compression ring is disposed in said spring tension collar to separate said knob handle, and said collar.

3. The gardening tool of claim 2, wherein said means for attaching said second plunger plate to said shaft is a trust allen screw.

4. The gardening tool of claim 3 wherein said upper handle has plastic handle covers.

5. The gardening tool of claim 4 wherein said depression member has plastic plugs inserted into each end.

6. The gardening tool of claim 5 wherein said means for preventing downward movement of said spring, is a spring collar disposed about and attached to said shaft and vertically disposed between said spring tension collar and the vertically lower end of said spring such that said spring is disposed between said spring collar and said spring tension collar, such that when said shaft moves up or down, said spring will compress or expand.

* * * * *